UNITED STATES PATENT OFFICE.

JONAS BROLIN, OF SIOUX FALLS, SOUTH DAKOTA, ASSIGNOR OF ONE-HALF TO LENIOUS E. BAKER, OF BAKER, MONTANA.

PROCESS FOR TREATING FLAX-PLANTS.

1,209,546.     Specification of Letters Patent.     Patented Dec. 19, 1916.

No Drawing.     Application filed August 21, 1916. Serial No. 116,097.

*To all whom it may concern:*

Be it known that I, JONAS BROLIN, a citizen of the United States, residing at Sioux Falls, in the county of Minnehaha and State of South Dakota, have invented certain new and useful Improvements in Processes for Treating Flax-Plants; and I do hereby declare the following to be a full, clear, and exact description of the invention, such as will enable others skilled in the art to which it appertains to make and use the same.

The process which forms the subject matter of the present invention, is a process for recovering from the mature flax plant, substantially all of the useful constituents thereof.

The process consists in the main of severing the heads from the mature stalks at a point which leaves the ends of the stalks open or at least open enough to permit the entry of rain, whereby natural retting is facilitated, permitting the stalks to remain thus exposed to weather conditions, until the natural retting has been practically concluded, harvesting, and separating the fiber from the shive. The seed is, of course, treated in the usual way to recover the oil for industrial purposes; the shive and fiber may be made into tow, and the fiber alone may be used for textile purposes. The chaff from the heads may also be used for litter or, in some instances, for cattle food. It will thus be seen that the entire stalk is used with the exception of the roots, which are too woody to contain much fiber and are difficult to harvest, since they, when pulled, always introduce a large amount of dirt and discoloration into the fiber.

It is estimated that about 18% of the world's flax (*Linum usitatissimum*) is grown in the northern part of this country. The flax grown in this country is, however, grown primarily for the seed. From this it results that the variety selected is one which will produce abundant seed, and this variety must be allowed to come to full maturity; that is, the seed must be permitted to become completely ripe, in order that the yield of oil may be as large as possible.

The plants are generally harvested by a reaping machine, bound in sheaves, and finally threshed in a threshing machine of improved type, and the straw which results either burned or wasted. This straw is brittle, too brittle to be used in making tow, because so much natural resin is present. Very often too, frost catches the plant before harvesting. If the plant is completely matured this will produce little effect. If, however, it is not quite ripe, the growth of the plant is checked, and the production of oil diminished.

Flax, when grown in the north of Europe, and particularly in Russia where labor is cheap, is grown from a plant of a slightly different selection, being selected for the quality and quantity of its fiber and not for its seed. This plant is harvested by pulling or uprooting just before it reaches full maturity, as the fiber is then in the best condition. The usual process of retting, hackling, etc., need not be discussed here.

In the plant grown in the United States, when grown for the seed, there is, notwithstanding the fact that it is grown for the seed and allowed to reach maturity, a quantity of fiber of fine character. Some attempt has hitherto been made to recover this fiber from the straw, and some of it has been used, or attempted to be used, in textile, paper, and other industries. A certain percentage of it each year is converted into upholsterer's tow, but four-fifths of it is burnt or wasted, as aforesaid.

The present process contemplates the selection of a seed which will produce both seed and fiber in fair quantity, though the process, as such, is applicable to plants grown from seed of any selection.

After the plant has reached its full maturity, the heads are severed by a suitable heading machine at a point which leaves the ends of the straw or stalk open. The heads thus removed are threshed and the seed recovered in any suitable manner, the chaff being used as desired. Since the plant reaches maturity in the autumn, the harvesting is, of course, done at that season, in order that no seed may be wasted by dropping or scattering. The straw or stalks from which the heads have thus been removed, is permitted to stand exposed to the weather during the winter months. During this exposure, since the upper ends of the stalks are open, the stalks being tubular, rain enters, and a natural retting process occurs. This retting is, in part, a fermenting action; that is, a consumption of the resins and gums natural to the plant, and which unite the fibrous cortex to the pithy shive by minute growths, or ferments. The rain itself has a solvent effect, to a certain extent, and washes out some of these gums. Moreover, the saturated plant is often exposed, during the fall and early spring, to constant thawing and freezing, which tends to still further loosen the attachment of the bark to the stem.

Usually, by the time spring comes, and by the time the ground is dry enough to withstand the weight of horses and of a reaper, the retting is practically complete. The stalks are then harvested by cutting with a reaping machine, or by a mowing machine if preferred, as close to the ground as possible. The plants thus harvested are then hackled or otherwise treated to separate the fiber from the shive. The former, if the treatment has been careful, is obtained to practically the full extent of the fibrous content of the plant, and is excellent for spinning and cordage purposes. No attempt is made to harvest the plants by pulling. This is objectionable for several reasons; and, moreover, the stalks by this time are too brittle to withstand the necessary treatment. The harvested stalks may be sent to a tow mill, where they may be put through the ordinary process for securing retted tow.

That which I claim as new and for which a patent is desired, is defined in the following claims:

1. The process of treating flax plants when grown for seed, which consists in removing the heads from the mature plants, leaving the stalks stand exposed to the retting action of the elements for several months, harvesting, and separating the fiber, from the shive, for spinning.

2. The process of treating mature flax plants, which consists in removing the heads at such a height as to leave the tubular stalks standing with open upper ends, thereby permitting the entrance of rain and frost, to effect the destruction and removal of natural resins and gums, and after said retting has been effected, reaping the stalks and removing the fiber.

3. The process of obtaining flax fiber and flax seed from the same plant, which consists in allowing the growing plant to reach full maturity, heading to remove the mature seed, at a point which permits rain to penetrate the ends of the stalks, leaving the stalks stand exposed to the natural retting effects of weather, until the fiber becomes loose, harvesting, and hackling.

4. The process of obtaining from the mature flax plant useful products, which consists in heading the full grown and mature plants, threshing the heads, to separate the seed for oil and the chaff for fodder, allowing the headed stalks to stand with their open ends exposed to the weather, for several months of frost and rain, then cutting the stalks, and finally reducing them to tow.

In testimony whereof, I affix my signature.

JONAS BROLIN.